(12) United States Patent
Altman et al.

(10) Patent No.: US 11,828,444 B1
(45) Date of Patent: Nov. 28, 2023

(54) MODULAR LIGHT POLE ASSEMBLY AND METHOD OF ASSEMBLING A MODULAR LIGHT POLE

(71) Applicant: Energy Light, Inc., Lake Zurich, IL (US)

(72) Inventors: Mikhail Altman, Buffalo Grove, IL (US); Sami Ozgen, Barrington, IL (US)

(73) Assignee: Energy Light, Inc., Lake Zurich, IL (US)

( * ) Notice: Subject to any disclaimer, the term of this patent is extended or adjusted under 35 U.S.C. 154(b) by 0 days.

(21) Appl. No.: 18/166,949

(22) Filed: Feb. 9, 2023

Related U.S. Application Data

(60) Provisional application No. 63/412,080, filed on Sep. 30, 2022.

(51) Int. Cl.
  *F21V 21/12* (2006.01)
  *F16B 7/04* (2006.01)

(52) U.S. Cl.
  CPC ............ *F21V 21/12* (2013.01); *F16B 7/0406* (2013.01); *Y10T 403/55* (2015.01)

(58) Field of Classification Search
  CPC ........ F16B 7/182; F16B 7/185; F16B 7/0406; F16B 7/0413; F16B 7/042; Y10T 403/50; Y10T 403/55; Y10T 403/57; Y10T 403/5733; Y10T 403/34; Y10T 403/348; Y10T 403/349; F21V 21/12
  See application file for complete search history.

(56) References Cited

U.S. PATENT DOCUMENTS

| | | | | |
|---|---|---|---|---|
| 4,691,818 | A * | 9/1987 | Weber | B65G 33/32 198/677 |
| 5,590,974 | A * | 1/1997 | Yang | A47B 47/005 403/171 |
| 6,926,459 | B1 * | 8/2005 | Oakley | F16B 7/185 403/289 |
| 10,781,838 | B2 * | 9/2020 | Koepke | F16B 7/0413 |
| 2002/0162936 | A1 * | 11/2002 | Mellardo | F16B 7/0413 248/562 |
| 2017/0233995 | A1 * | 8/2017 | Abernathy | E04B 1/2403 52/845 |
| 2017/0233996 | A1 * | 8/2017 | Abernathy | F16B 7/182 52/698 |
| 2018/0185970 | A1 * | 7/2018 | Simmons | F16B 5/0692 |
| 2018/0361188 | A1 * | 12/2018 | Rexroad | F16B 7/185 |

FOREIGN PATENT DOCUMENTS

| | | | | |
|---|---|---|---|---|
| DE | 3208576 A1 | * | 9/1983 | |
| DE | 29514208 U1 | * | 12/1995 | |
| DE | 102008055686 A1 | * | 6/2010 | ............ F16B 7/0413 |
| FR | 2807121 A1 | * | 10/2001 | ............ E04F 11/181 |
| GB | 2495395 A | * | 4/2013 | ............... E04G 7/20 |
| WO | WO-2019198660 A1 | * | 10/2019 | ............ F16B 4/004 |

\* cited by examiner

*Primary Examiner* — Jonathan P Masinick
(74) *Attorney, Agent, or Firm* — MARSHALL, GERSTEIN & BORUN LLP

(57) ABSTRACT

A light pole assembly, and a method of assembling a light pole assembly that facilitates securement of multiple light pole segments. The light pole assembly includes a first pole shaft, a second pole shaft, and a mounting connector. Dimensions of the first pole shaft and the second pole shaft are substantially the same and dimensions of the mounting connector are smaller than the dimensions of the first pole shaft and of the second pole shaft.

15 Claims, 9 Drawing Sheets

MODULAR LIGHT POLE ASSEMBLY AND METHOD OF ASSEMBLING A MODULAR LIGHT POLE

FIELD OF THE DISCLOSURE

This disclosure relates generally to a modular light pole assembly, and more specifically, a method of assembling a modular light pole assembly in the field.

DESCRIPTION OF THE PRIOR ART

Light poles vary in length, often between 8 and 20 feet, with lengths of 12 feet, 16 feet, and 20 feet being typical. The length of the poles poses a challenge to shipping them to a job site for installation. Prior solutions have been proposed to provide telescoping poles or segmented poles that are spliced together at an installation site. Current modular poles are difficult to assemble and not completely rigid until fully secured with fasteners. Telescoping solutions require nesting pole segments, such that each successively-lower pole segment must be larger than the previous pole segment, resulting in a lower-most pole segment occupying larger-than-optimal dimensions.

There is a need for an easy-to-assemble modular light pole that can be shipped in segments of uniform length and width, and which can be assembled at an installation site.

SUMMARY

In a first example, a light pole assembly includes a first pole shaft, a second pole shaft, and a mounting connector. The first pole shaft includes a first front wall, a first rear wall, and a first pair of side walls connecting the first front wall and the first rear wall. The first front wall, the first rear wall, and the first pair of sidewalls form a substantially square first tube. The second pole shaft includes a second front wall, a second rear wall, and a second pair of side walls connecting the second front wall and the second rear wall. The second front wall, the second rear wall, and the second pair of sidewalls form a substantially square second tube. The mounting connector includes a connecting front wall, a connecting rear wall, and a connecting pair of side walls. The connecting front wall, the connecting rear wall, and the connecting pair of side walls form a substantially square mounting connector. The first pole shaft and the second pole shaft have substantially the same dimensions. The mounting connector has smaller dimensions than the first pole shaft and of the second pole shaft such that a first end of the mounting connector is sized to be inserted at least partially within the first pole shaft and a second end of the mounting connector is sized to be inserted at least partially within the second pole shaft.

The above example of a light pole assembly may further include any one or more of the following optional forms.

In one optional form, the mounting connector further comprises an exterior ledge extending outward from an outer surface of the mounting connector.

In another optional form, the ledge is positioned approximately half way between a first end of the mounting connector and a second end of the mounting connector.

In yet another optional form, the mounting connector includes at least one opening in an exterior wall thereof and the first pole shaft includes at least one opening in an exterior wall thereof, and the at least one opening in the exterior wall of the mounting connector is aligned with the at least one opening in the exterior wall of the first pole shaft when the mounting connector is inserted into the first pole shaft.

In yet another optional form, a fastener extends through the at least one opening in the exterior wall of the mounting connector and through the at least one opening in the exterior wall of the first pole shaft.

In yet another optional form, the mounting connector further comprises an internal shelf.

In yet another optional form, the internal shelf includes a shelf opening.

In yet another optional form, the shelf opening is circular.

In yet another optional form, the substantially square mounting connector comprises a connector wall length of between 3.6 in (9.1 cm) and 3.9 in (9.9 cm) on each side, preferably between 3.7 in (9.4 cm) and 3.8 in (9.65 cm), and more preferably approximately 3.74 in (9.5 cm).

In another example, a method for assembling a light pole assembly includes providing a first pole shaft, a second pole shaft, and a mounting connector. The first pole shaft includes a first front wall, a first rear wall, and a first pair of side walls connecting the first front wall and the first rear wall. The first front wall, the first rear wall, and the first pair of sidewalls form a substantially square first tube. The second pole shaft includes a second front wall, a second rear wall, and a second pair of side walls connecting the second front wall and the second rear wall. The second front wall, the second rear wall, and the second pair of sidewalls form a substantially square second tube. The mounting connector includes a connecting front wall, a connecting rear wall, and a connecting pair of side walls. The connecting front wall, the connecting rear wall, and the connecting pair of side walls form a substantially square mounting connector. The first pole shaft and the second pole shaft have substantially the same dimensions. The mounting connector has smaller dimensions than the first pole shaft and of the second pole shaft such that a first end of the mounting connector is sized to be inserted at least partially within the first pole shaft and a second end of the mounting connector is sized to be inserted at least partially within the second pole shaft. A first end of the mounting connector is at least partially inserted into an open end of the first pole shaft. A second end of the mounting connector is at least partially inserted into an open end of the second pole shaft.

The above method of assembling a light pole assembly may further include one or more of the following optional forms.

In one optional form, the first end of the mounting connector is inserted into the open end of the first pole shaft until an external ledge on the mounting connector contacts the open end of the first pole shaft.

In another optional form, the second end of the mounting connector is inserted into the open end of the second pole shaft until the external ledge on the mounting connector contacts the open end of the second pole shaft.

In another optional form, an opening on an external wall of the mounting connector is aligned with an opening on an external wall of the first pole shaft and a fastener is inserted through the opening on the external wall of the mounting connector and through the opening on the external wall of the first pole shaft.

In another optional form, the substantially square mounting connector comprises a mounting connector wall length of between 3.6 in (9.1 cm) and 3.9 in (9.9 cm) on each side, preferably between 3.7 in (9.4 cm) and 3.8 in (9.65 cm), and more preferably approximately 3.74 in (9.5 cm).

DETAILED DESCRIPTION

Figure 1:
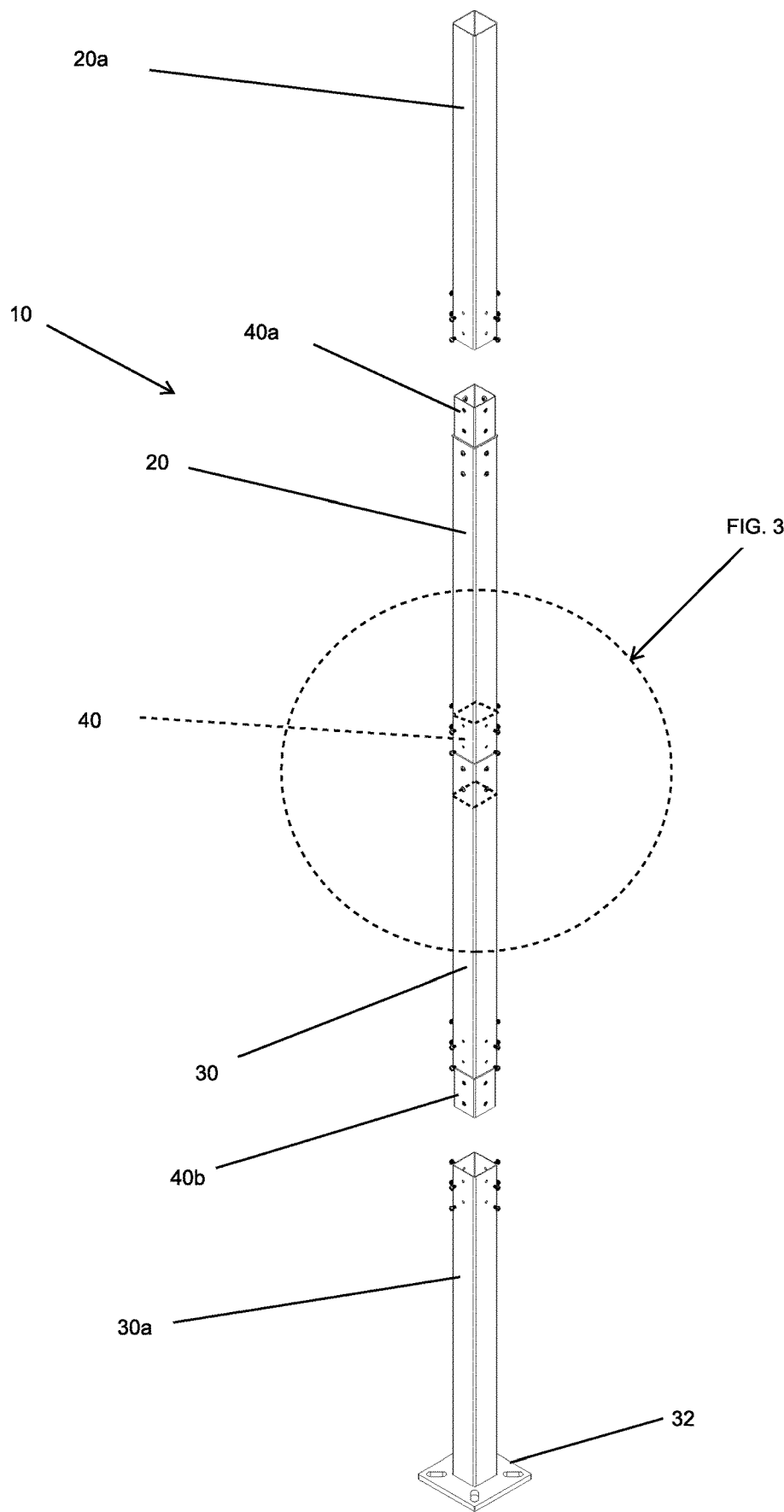
FIG. 1 is a front, partially exploded perspective view of a light pole assembly of the present disclosure.
Figure 2:
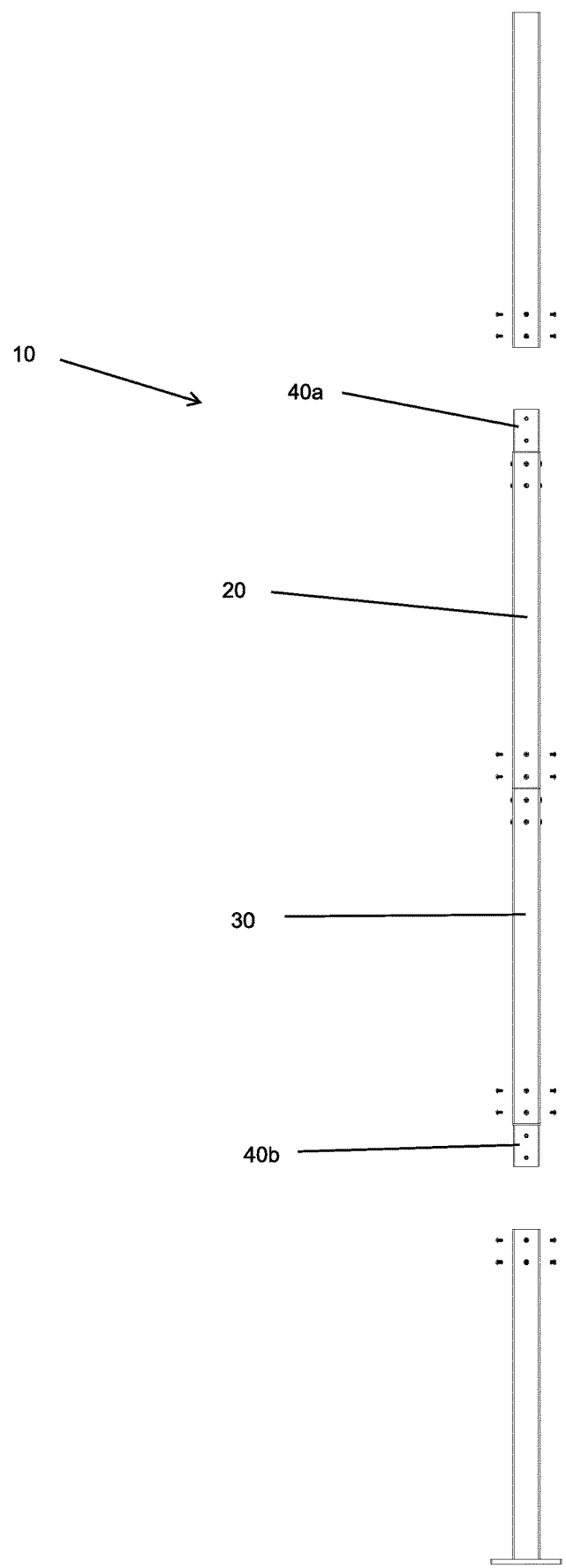
FIG. 2 is a front elevation view of the light pole assembly of FIG. 1.
Figure 3:
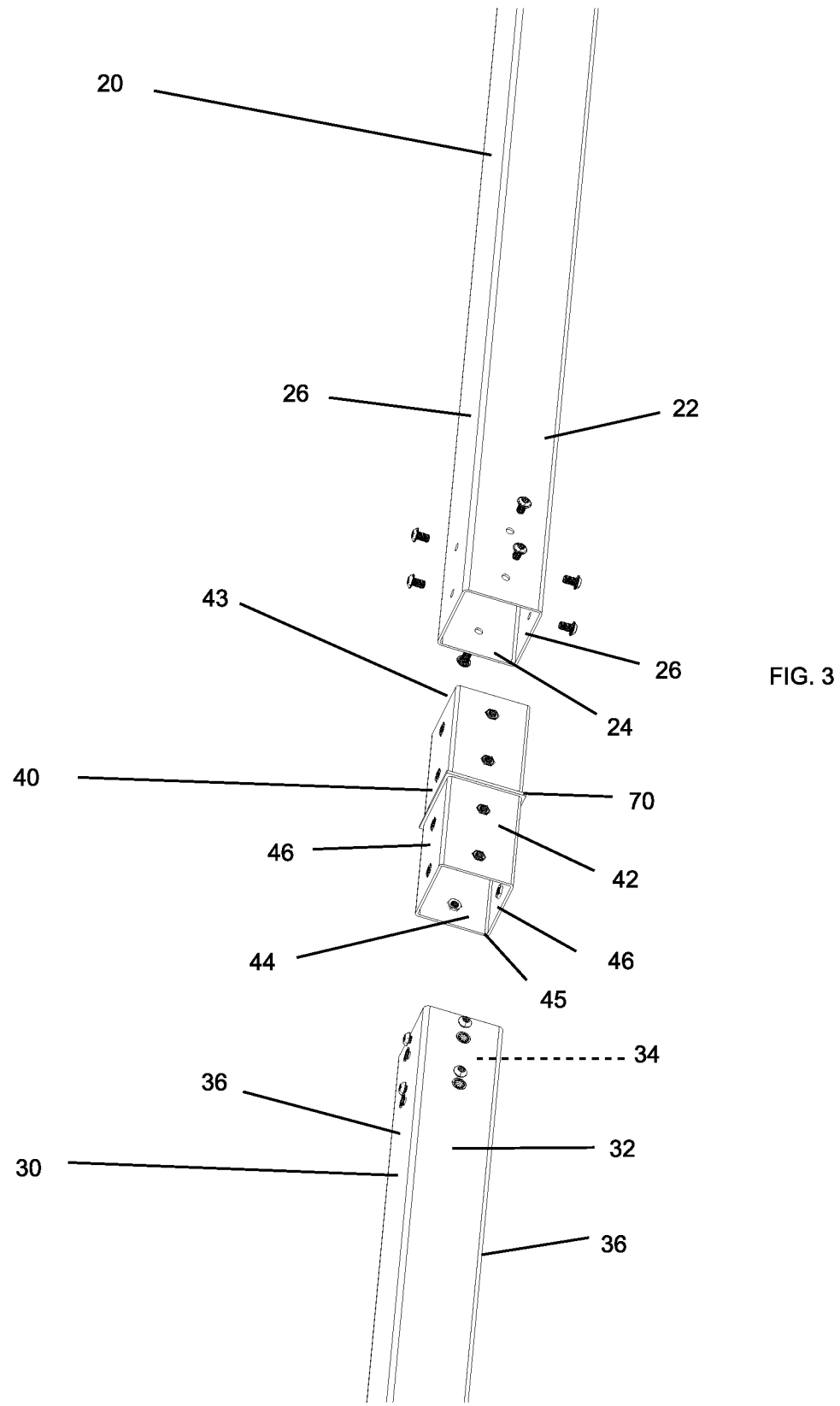
FIG. 3 close up perspective view of a portion of the light pole assembly of FIG. 1, identified by the circle labeled FIG. 3 of FIG. 1.
Figure 4:
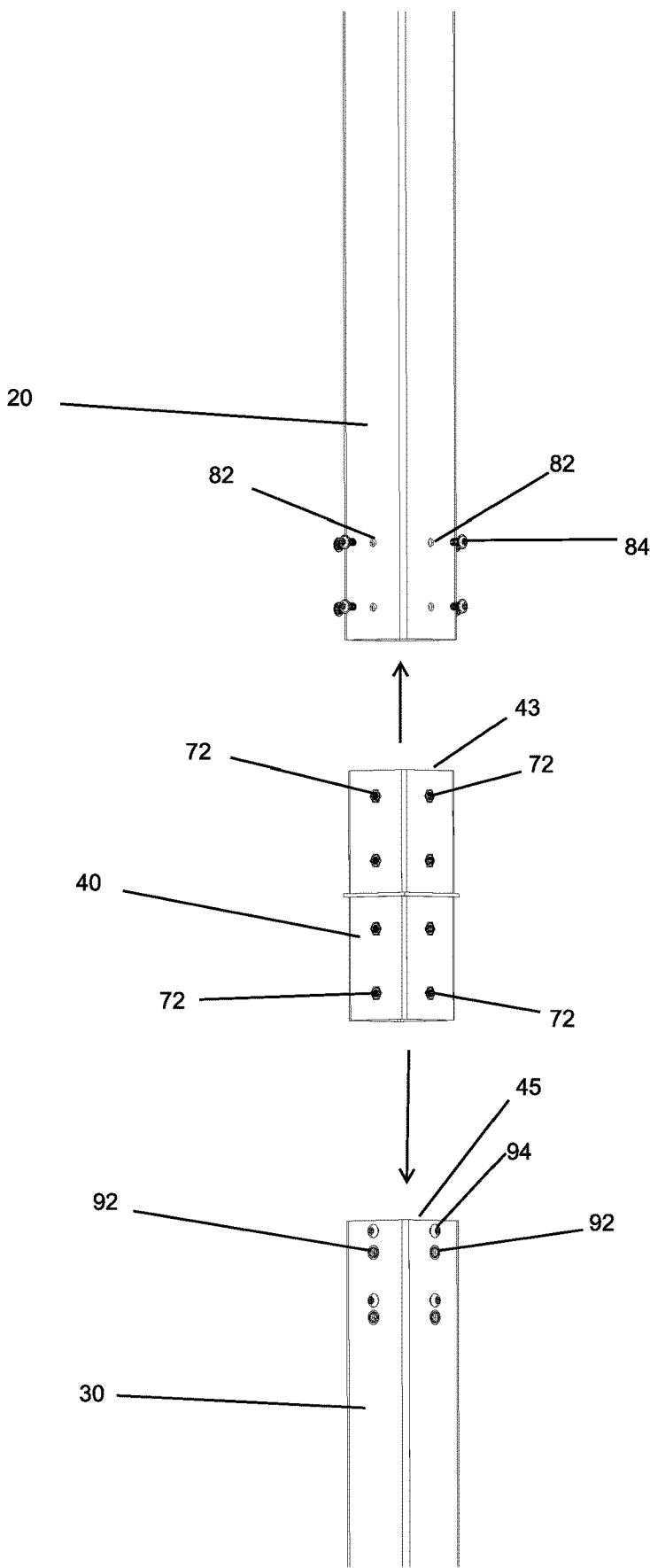
FIG. 4 is corner elevation view of the close up portion of the light pole assembly of FIG. 3.

Turning now to the figures, specifically FIGS. 1-4, a light pole assembly 10 includes a first pole shaft 20, a second pole shaft 30, and a mounting connector 40. The light pole assembly 10 may optionally include a plurality of first pole shafts 20, 20a, a plurality of second pole shafts 30, 30a, and a plurality of mounting connectors 40, 40a, 40b. In other embodiments, the light pole assembly 10 may optionally include between two and five total first and second pole shafts 20, 30. Each pole shaft 20, 30 may have a length of approximately 4 ft (1.22 m) for a total light pole assembly 10 length of between 8 ft (2.44 m) and 20 ft (6.1 m). One first pole shaft 20a in FIG. 1, may form a top tube of the assembled light pole and one second pole shaft 30a in FIG. 1 may form a bottom tube of the assembled light pole. The second pole shaft 30a (the bottom tube in FIG. 1) may include a mounting flange 32 for securing the light pole to a surface, such as a paved surface or a ground surface. For the sake of brevity, a single first pole shaft 20, a single second pole shaft 30, and a single mounting connector 40 will be discussed further below.

The first pole shaft 20 includes a first front wall 22, a first rear wall 24, and a first pair of side walls 26 connecting the first front wall 22 and the first rear wall 24, the first front wall 22, the first rear wall 24, and the first pair of side walls 26 may be collectively referred to below as first external walls. The first front wall 22, the first rear wall 24, and the first pair of sidewalls 26 form a substantially square first tube.

The second pole shaft 30 includes a second front wall 32, a second rear wall 34, and a second pair of side walls 36 connecting the second front wall 32 and the second rear wall 34, the second front wall 32, the second rear wall 34, and the second pair of side walls 36 may be collectively referred to below as second external walls. The second front wall 32, the second rear wall 34, and the second pair of sidewalls 36 form a substantially square second tube.

The mounting connector includes a connecting front wall 42, a connecting rear wall 44, and a connecting pair of side walls 46, the connecting front wall 42, the connecting rear wall 44, and the connecting pair of side walls 46 may be collectively referred to as connecting external walls below.

The connecting front wall 42, the connecting rear wall 44, and the connecting pair of side walls 46 form a substantially square mounting connector.

The first pole shaft 20 and the second pole shaft 30 have substantially the same dimensions. In some embodiments, the first pole shaft 20 and the second pole shaft 30 are approximately 4 in$^2$ (10.16 cm$^2$) in cross-section. The mounting connector 40 has smaller dimensions than the first pole shaft 20 and of the second pole shaft 30 such that a first end 43 of the mounting connector 40 is sized to be inserted at least partially within the first pole shaft 20 and a second end 45 of the mounting connector 40 is sized to be inserted at least partially within the second pole shaft 30. In a preferred embodiment, the mounting connector 40 comprises a mounting connector wall length of between 3.6 in (9.1 cm) and 3.9 in (9.9 cm), preferably between 3.7 in (9.4 cm) and 3.8 in (9.65 cm), and more preferably approximately 3.74 in (9.5 cm). The preferred embodiment of the mounting connector 40 may be referred to as between a 3.6 in$^2$ and a 3.9 in$^2$ (9.1 cm2 and 9.9 cm2) tube, more preferably between a 3.7 in$^2$ and a 3.8 in$^2$ (9.4 cm$^2$ and 9.65 cm$^2$) tube, and even more preferably approximately a 3.74 in$^2$ (9.5 cm$^2$) tube.

Figure 5:
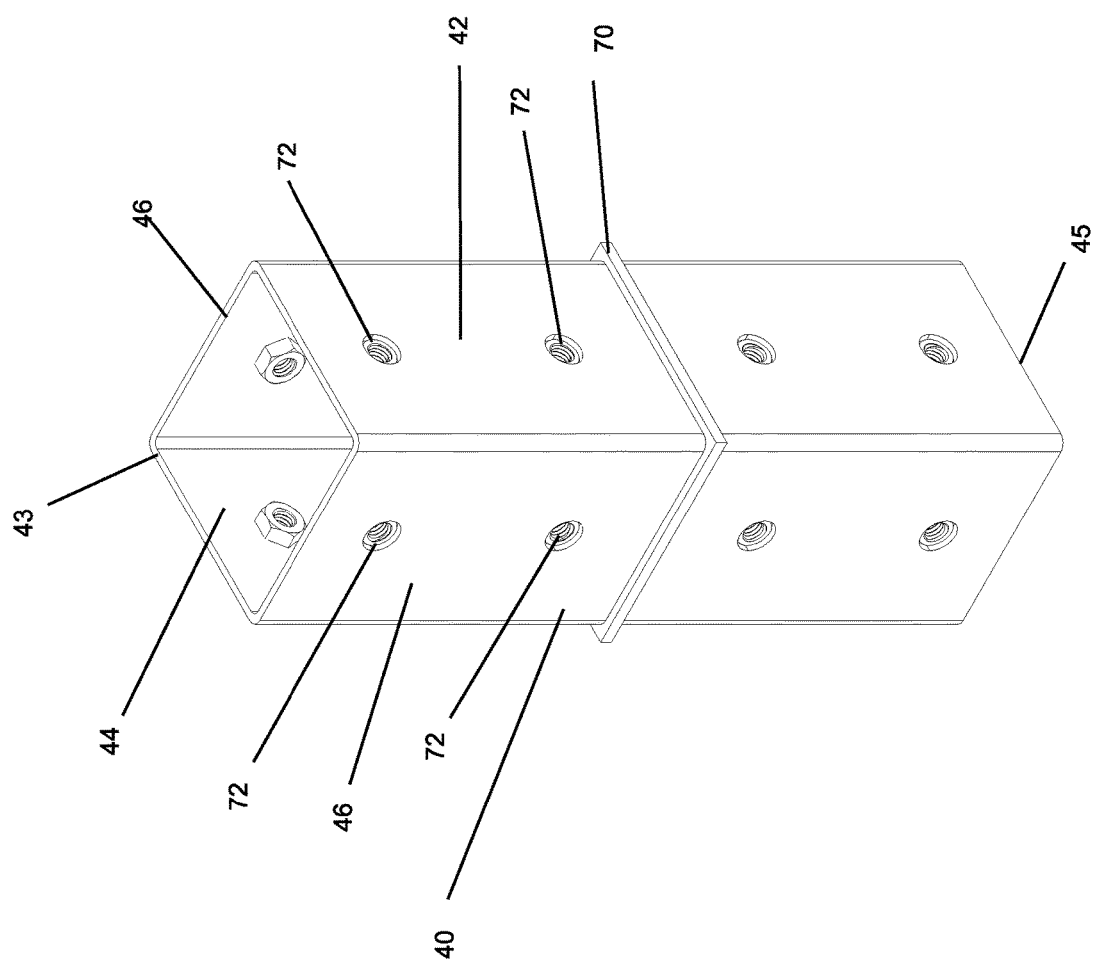
FIG. 5 is a front perspective view of a mounting connector of the light pole assembly of FIG. 1.
Figure 6:
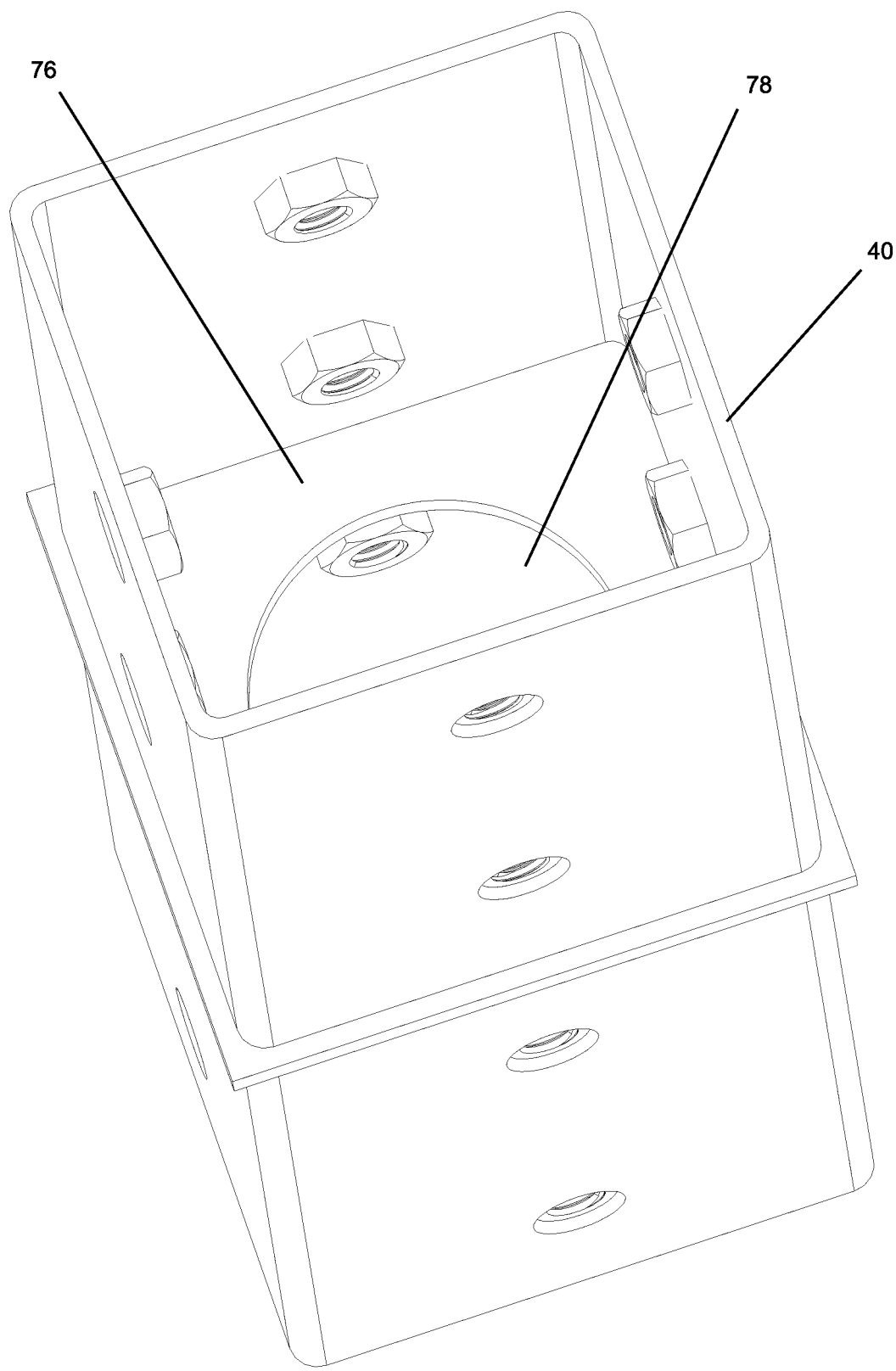
FIG. 6 is a top perspective view of the mounting connector of FIG. 5.
Figure 7:
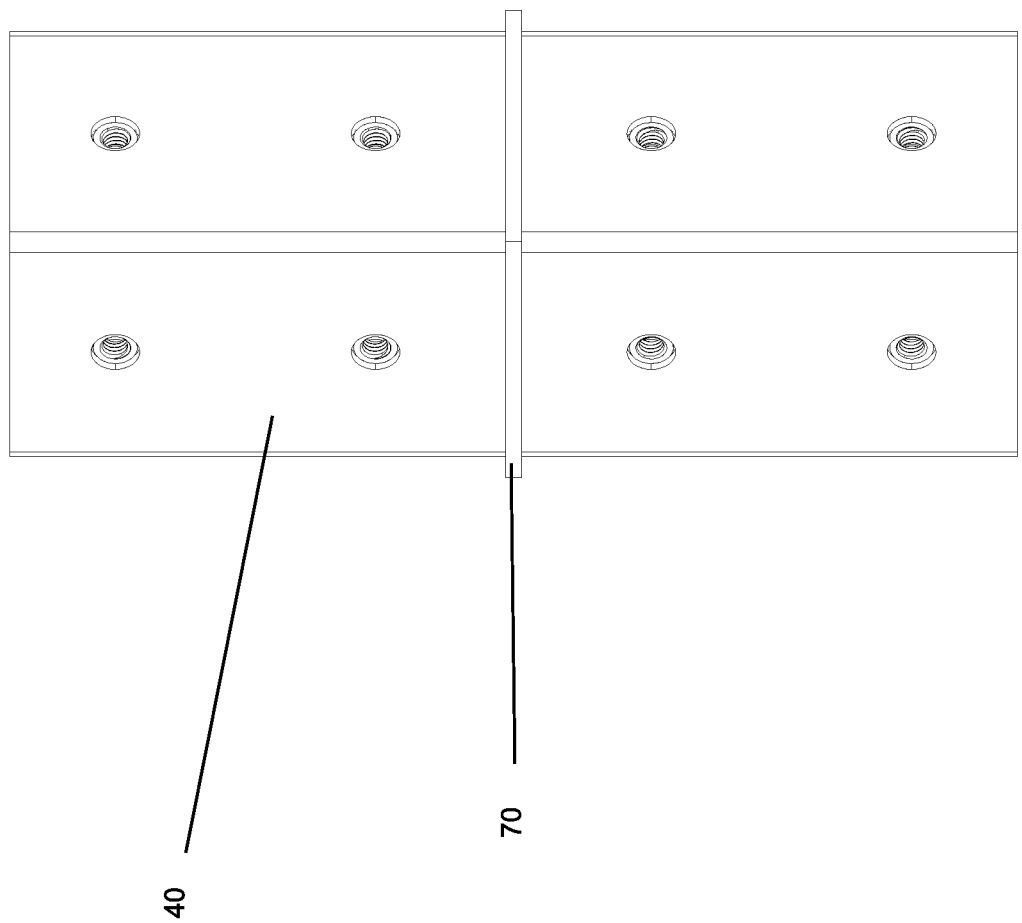
FIG. 7 is an angled elevation view of the mounting connector of FIG. 5.
Figure 8:
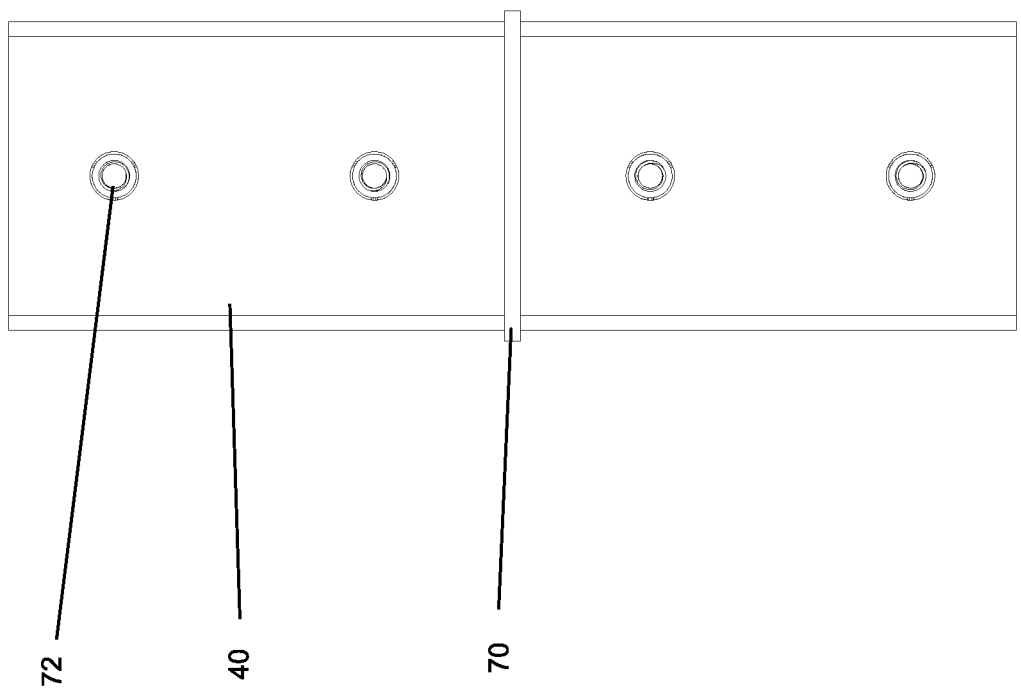
FIG. 8 is a front elevation view of the mounting connector of FIG. 5.
Figure 9:
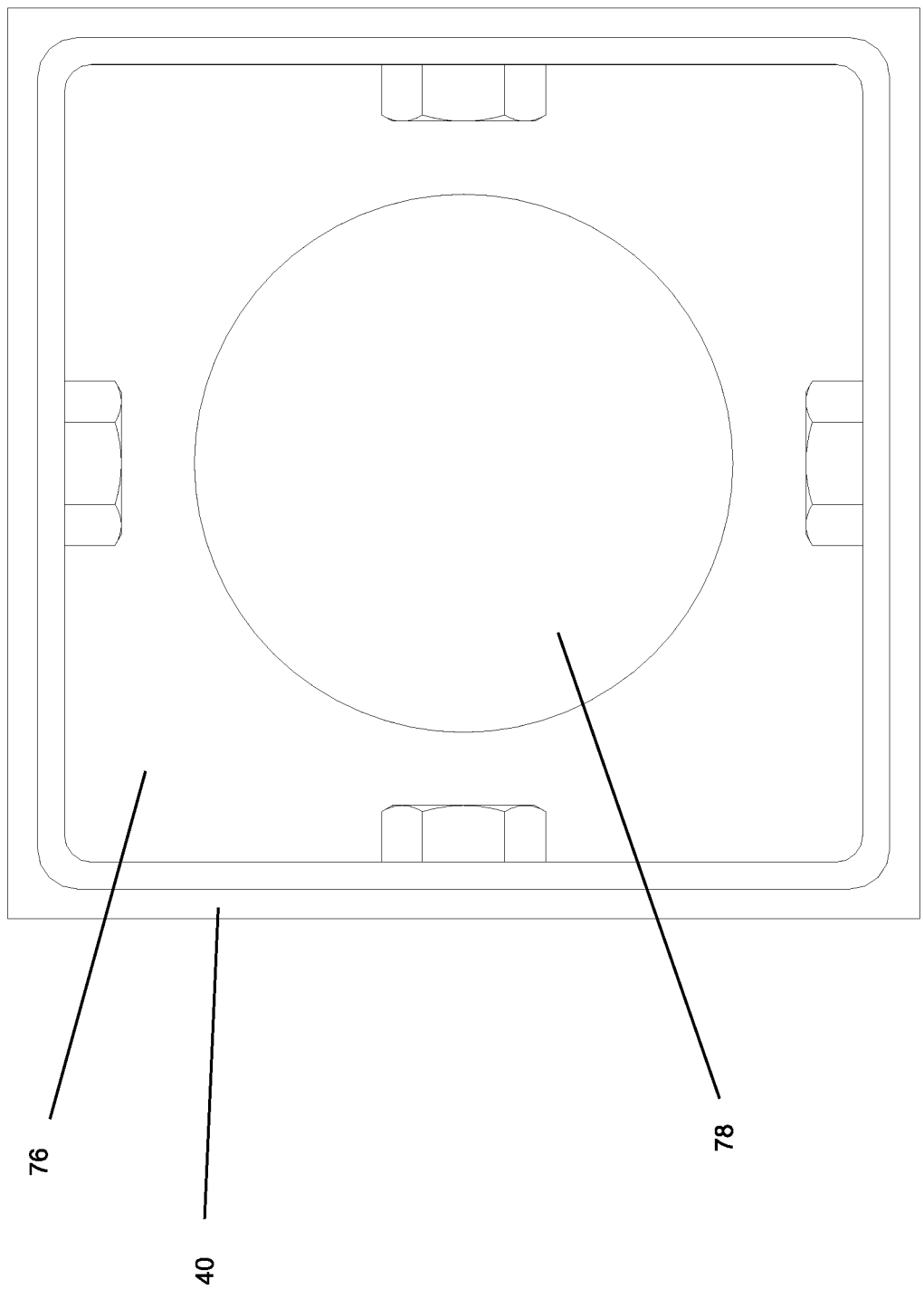
FIG. 9 is a top view of the mounting connector of FIG. 5.

Turning now to FIGS. 5-9, the mounting connector 40 may further include an exterior ledge 70 extending outward from the external walls of the mounting connector 40. The exterior ledge 70 may be positioned approximately half way between the first end 43 of the mounting connector 40 and the second end 45 of the mounting connector 40, thereby dividing the mounting connector 40 into two substantially equal segments.

The mounting connector 40 includes at least one opening 72 in an exterior wall thereof. In the illustrated embodiment, the mounting connector 40 includes a plurality of openings 72 in each of the front wall 42, the rear wall 44, and the pair of side walls 46. Similarly, the first pole shaft 20 (FIG. 4) includes at least one opening 82, and a preferably a plurality of openings 82, in at each of the front wall 22, the rear wall 24, and the pair of side walls 26. The openings in the exterior wall of the mounting connector 40 are aligned with the openings in the exterior wall of the first pole shaft 30 when the mounting connector 40 is inserted into the first pole shaft 30. A fastener 84 may extend through the at least one opening 72 in the exterior wall of the mounting connector 40 and through the at least one opening 82 in the exterior wall of the first pole shaft 20.

Similar openings 92 and fasteners 94 may be used to connect the mounting connector 40 with the second pole shaft, but a discussion of these connections are omitted for the sake of brevity.

The mounting connector 40 may further include an internal shelf 76 having a shelf opening 78. In the illustrated embodiment, the shelf opening 78 is circular, although other embodiments may have other shaped openings. The internal shelf 76 adds rigidity to the overall mounting connector 40 structure and the shelf opening 78 allows electrical connections to be passed through the open center of the assembled light pole. While the internal shelf 76 is illustrated as a flat rectangular (square) platform with a circular opening 78 therein, the internal shelf 76 may take other forms, such as a plurality of studs, ribs, ridges, prongs, castellations, detents, or other inwardly-directed projections.

The light pole assembly 10 described above may be advantageously easily and quickly assembled in the field with minimal tools. Initially, one or more of the following are provided at the assembly site, the first pole shaft 20, the second pole shaft 30, and the mounting connector 40. The first end 43 of the mounting connector 40 is at least partially inserted into an open end of the first pole shaft 20, as illustrated by the arrow between the mounting connector 40 and the first pole shaft 20 in FIG. 4. The second end 45 of the mounting connector 40 is at least partially inserted into an open end of the second pole shaft 30, as illustrated by the arrow between the mounting connector 40 and the second pole shaft 30 in FIG. 4.

The first end 43 of the mounting connector 40 is inserted into the open end of the first pole shaft 20 until the external ledge 70 on the mounting connector 40 contacts the open end of the first pole shaft 20. The second end 45 of the mounting connector 40 is inserted into the open end of the second pole shaft 30 until the external ledge 70 on the mounting connector 40 contacts the open end of the second pole shaft 30. When fully inserted, the external ledge 70 forms a plug for the open ends of the first pole shaft 20 and for the second pole shaft 30.

Once the mounting connector 40 is fully inserted into the first pole shaft 20, the openings 72 on the external walls of the mounting connector 40 are aligned with the openings 82 on the external walls of the first pole shaft 20 and the fasteners 84 are inserted through the openings 72 on the external walls of the mounting connector 40 and through the openings 82 on the external walls of the first pole shaft 20.

In a similar manner, once the mounting connector 40 is fully inserted into the second pole shaft 30, the openings 72 on the external walls of the mounting connector 40 are aligned with the openings 92 on the external walls of the second pole shaft 30 and the fasteners 94 are inserted through the openings 72 on the external walls of the mounting connector 40 and through the openings 92 on the external walls of the second pole shaft 30.

According to the illustrated embodiment, the mounting connector 40, and the first and second pole shafts 20, 30, are illustrated as having square a cross-section, but it will be understood by those skilled in the art that depending on the geometry of the pole segments to be joined, the cross-section of the mounting connector 40, and of the first and second pole shafts 20, 30, may take other cross-sectional shapes. For example, for a light pole with a circular cross-sectional shape, the mounting connector 40 and/or the first and second pole shafts 20, 30 may have a cylindrical shape, i.e., a round cross-section.

In one embodiment, the first and second pole shafts may preferably have a length of 4 feet (1.22 m). For a 20 foot (6.1 m) light pole, five such body shafts would be used, requiring a total of four mounting connectors 40. More generally, for a given number "n" of segments to be used in the modular assembly of a light pole according to the present disclosure, one would use one less, or a total of n−1, mounting connectors 40. A benefit of the 4 foot length (1.22 m) pole shafts is that this length translates to easy palletization, considering a standard pallet size of 48 inches (1.22 m)×42 inches (1.067 m), facilitating packing, storage, and transportation to an installation site, without the need for specialty carriers or other accommodations.

A benefit of the assembly and method of the present disclosure is that the ability to utilize relatively short pole shafts in the assembly of a light pole is found to result in light poles having greater overall sturdiness and stability, with reduced deflection, even in high wind-prone locations. While conventional light poles require heavy 7-gauge steel, it is found that durable, high-quality light poles can be constructed using light pole shafts of only 11-gauge steel even in such high wind-prone locations.

While various embodiments have been described herein, it will be understood that modifications may be made thereto that are still considered within the scope of the appended claims.

What is claimed is:

1. A light pole assembly comprising:
a first pole shaft, the first pole shaft including a first front wall, a first rear wall, and a first pair of side walls connecting the first front wall and the first rear wall, the first front wall, the first rear wall, and the first pair of sidewalls forming a substantially square first tube;
a second pole shaft, the second pole shaft including a second front wall, a second rear wall, and a second pair of side walls connecting the second front wall and the second rear wall, the second front wall, the second rear wall, and the second pair of sidewalls forming a substantially square second tube; and
a mounting connector including a connecting front wall, a connecting rear wall, and a connecting pair of side walls, the connecting front wall, the connecting rear wall, and the connecting pair of side walls forming a substantially square mounting connector having a square tube shape that has a constant square cross-sectional dimension from a first end to a second end; and
an exterior ledge extending outward from an outer surface of the mounting connector, the exterior ledge having a thickness that is less than a width of one of the side walls,
wherein the first pole shaft and the second pole shaft have substantially the same dimensions, and the mounting connector has smaller dimensions than the first pole shaft and of the second pole shaft such that a first end of the mounting connector is sized to be inserted at least partially within the first pole shaft and a second end of the mounting connector is sized to be inserted at least partially within the second pole shaft.

2. The light pole assembly of claim 1, wherein the ledge is positioned approximately half way between the first end of the mounting connector and the second end of the mounting connector.

3. The light pole assembly of claim 1, wherein the mounting connector includes at least one opening in an exterior wall thereof and the first pole shaft includes at least one opening in an exterior wall thereof, and the at least one opening in the exterior wall of the mounting connector is aligned with the at least one opening in the exterior wall of the first pole shaft when the mounting connector is inserted into the first pole shaft.

4. The light pole assembly of claim 3, further comprising a fastener extending through the at least one opening in the exterior wall of the mounting connector and through the at least one opening in the exterior wall of the first pole shaft.

5. The light pole assembly of claim 1, wherein the mounting connector further comprises an internal shelf.

6. The light pole assembly of claim 5, wherein the internal shelf includes a shelf opening.

7. The light pole assembly of claim 6, wherein the shelf opening is circular.

8. The light pole assembly of claim 1, wherein the mounting connector has a substantially square-shape and comprises a mounting connector wall length of between 3.6 in (9.1 cm) and 3.9 in (9.9 cm).

9. The light pole assembly of claim 1, wherein the exterior ledge extends outward from the mounting connector a distance that is equal to a thickness of the side wall of the pole segment.

10. The light pole assembly of claim 1, further comprising a mounting bracket operatively connected to one end of one of the first pole shaft or the second pole shaft.

11. A method for assembling a light pole assembly, the method comprising:

providing, a first pole shaft, the first pole shaft including a first front wall, a first rear wall, and a first pair of side walls connecting the first front wall and the first rear wall, the first front wall, the first rear wall, and the first pair of sidewalls forming a substantially square first tube;

a second pole shaft, the second pole shaft including a second front wall, a second rear wall, and a second pair of side walls connecting the second front wall and the second rear wall, the second front wall, the second rear wall, and the second pair of sidewalls forming a substantially square second tube;

a mounting connector including a connecting front wall, a connecting rear wall, and a connecting pair of side walls, the connecting front wall, the connecting rear wall, and the connecting pair of side walls forming a substantially square mounting connector having a square tube shape that has a constant square cross-sectional dimension from a first end to a second and; and an exterior ledge extending outward from an outer surface of the mounting connector, the exterior ledge having a thickness that is less than a width of one of the side walls;

at least partially inserting a first end of the mounting connector into an open end of the first pole shaft; and at least partially inserting a second end of the mounting connector into an open end of the second pole shaft.

12. The method of claim 11, further comprising inserting the first end of the mounting connector into the open end of the first pole shaft until the external ledge on the mounting connector contacts the open end of the first pole shaft.

13. The method of claim 12, further comprising inserting the second end of the mounting connector into the open end of the second pole shaft until the external ledge on the mounting connector contacts the open end of the second pole shaft.

14. The method of claim 11, further comprising aligning an opening on an external wall of the mounting connector with an opening on an external wall of the first pole shaft and inserting a fastener through the opening on the external wall of the mounting connector and through the opening on the external wall of the first pole shaft.

15. The method of claim 11, wherein the mounting connector has a substantially square-shape and comprises a mounting connector wall length of between 3.6 in (9.1 cm) and 3.9 in (9.9 cm) on each external wall.

* * * * *

UNITED STATES PATENT AND TRADEMARK OFFICE
CERTIFICATE OF CORRECTION

PATENT NO. : 11,828,444 B1
APPLICATION NO. : 18/166949
DATED : November 28, 2023
INVENTOR(S) : Mikhail Altman et al.

Page 1 of 1

It is certified that error appears in the above-identified patent and that said Letters Patent is hereby corrected as shown below:

In the Claims

At Column 6, Line 17, "tube; and" should be -- tube; --.

At Column 6, Line 39, "half way" should be -- halfway --.

At Column 6, Line 65, "connector a" should be -- connector at a --.

At Column 7, Line 27, "and; and" should be -- end; and --.

Signed and Sealed this
Seventeenth Day of September, 2024

*Katherine Kelly Vidal*

Katherine Kelly Vidal
*Director of the United States Patent and Trademark Office*